United States Patent
Ray

(10) Patent No.: US 12,174,692 B1
(45) Date of Patent: Dec. 24, 2024

(54) PROACTIVE MICROSERVICE MIGRATION PRIOR TO SERVER FAILURE

(71) Applicant: INTERNATIONAL BUSINESS MACHINES CORPORATION, Armonk, NY (US)

(72) Inventor: Kaustabha Ray, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 18/333,604

(22) Filed: Jun. 13, 2023

(51) Int. Cl.
*G06F 11/00* (2006.01)
*G06F 11/07* (2006.01)

(52) U.S. Cl.
CPC ........ *G06F 11/076* (2013.01); *G06F 11/0709* (2013.01); *G06F 2201/805* (2013.01)

(58) Field of Classification Search
CPC . G06F 11/076; G06F 11/0709; G06F 11/0793
See application file for complete search history.

(56) References Cited

U.S. PATENT DOCUMENTS

| | | | |
|---|---|---|---|
| 10,326,766 B2 | 6/2019 | Egner et al. | |
| 10,778,779 B2 | 9/2020 | Vrzic et al. | |
| 2009/0112531 A1* | 4/2009 | Sato | G06Q 10/06 703/2 |
| 2020/0364086 A1* | 11/2020 | Gavali | G06F 11/3414 |
| 2021/0365357 A1 | 11/2021 | Gamliel | |
| 2022/0030087 A1 | 1/2022 | Chatterjee | |
| 2022/0147409 A1 | 5/2022 | Linck | |
| 2023/0023744 A1* | 1/2023 | Verma | G06F 11/3006 |
| 2023/0069074 A1 | 3/2023 | Chen | |

OTHER PUBLICATIONS

Kwiatkowska et al., Stochastic Model Checking, 7th International School on Formal Methods for the Design of Computer, Communication, and Software Systems, SFM 2007, Bertinoro, Italy, May 28-Jun. 2, 2007, Advanced Lectures 7 (2007): 220-270.

(Continued)

*Primary Examiner* — Katherine Lin
(74) *Attorney, Agent, or Firm* — Schmeiser, Olsen & Watts, LLP; Aaron Pontikos

(57) ABSTRACT

A method, computer program product, and computer system for proactive microservice migration prior to server failure. A directed acyclic graph representing a microservice-based application and including nodes representing microservices is received. Multiple execution paths passing through the nodes are identified. Multiple unique servers configured to provide the microservices are identified. A Continuous Time Markov Chain model generated for each unique server is characterized by a failure rate and a repair rate of each unique server. A weight is computed for each unique server. A failure probability of each execution path is computed in dependence on the weight, and both failure and repair rate, of the unique servers. One or more vulnerable paths are selected from the multiple execution paths, wherein the failure probability of each selected vulnerable path exceeds a specified failure probability threshold. All microservices on at least one vulnerable path are migrated to one or more other servers.

20 Claims, 7 Drawing Sheets

(56) References Cited

OTHER PUBLICATIONS

Edinger et al., Fault-avoidance strategies for context-aware schedulers in pervasive computing systems, 2017 IEEE International Conference on Pervasive Computing and Communications (PerCom), IEEE, 2017, Authorized licensed use limited to: IBM. Downloaded on May 22, 2023 at 19:08:59 UTC from IEEE Xplore, 10 pages.

Ray et al., Prioritized Fault Recovery Strategies for Multi-Access Edge Computing Using Probabilistic Model Checking, IEEE Transactions on Dependable and Secure Computing (2022), Authorized licensed use limited to: IBM. Downloaded on May 22, 2023 at 19:08:16 UTC from IEEE Xplore, IEEE Transactions on Dependable and Secure Computing, vol. 20, No. 1, Jan./Feb. 2023, 16 pages.

Ghorab et al., SDN-based Service Discovery and Assignment Framework to Preserve Service Availability in Telco-based Multi-Access Edge Computing, In 2022 IEEE 6th International Conference on Fog and Edge Computing (ICFEC), pp. 100-104. IEEE, 2022, Authorized licensed use limited to: IBM. Downloaded on May 22, 2023 at 19:11:01 UTC from IEEE Xplore, 5 pages.

Liu et al., A fast algorithm for energy-saving offloading with reliability and latency requirements in multi-access edge computing, IEEE Access 8 (2019): 151-161, accepted Dec. 10, 2019, date of publication Dec. 23, 2019, date of current version Jan. 2, 2020. Digital Object Identifier 10.1109/ACCESS.2019.2961453.

Ray et al., Proactive microservice placement and migration for mobile edge computing, In 2020 IEEE/ACM Symposium on Edge Computing (SEC), pp. 28-41. IEEE, 2020, 978-1-7281-5943-0/20/ $31.00 © 2020 IEEE, DOI 10.1109/SEC50012.2020.00010, Authorized licensed use limited to: IBM. Downloaded on May 22, 2023 at 19:07:46 UTC from IEEE Xplore.

Luo et al., Characterizing microservice dependency and performance: Alibaba trace analysis, In Proceedings of the ACM Symposium on Cloud Computing, pp. 412-426. 2021, SoCC '21, Nov. 1-4, 2021, Seattle, WA, USA © 2021 Association for Computing Machinery, ACM ISBN 978-1-4503-8638-8/21/11, Retrieved from Internet: https://doi.org/10.1145/3472883.3487003.

Calder et al., Stochastic model checking for predicting component failures and service availability, IEEE Transactions on Dependable and Secure Computing 16, No. 1 (2017): 174-187, IEEE Transactions on Dependable and Secure Computing, vol. 16, No. 1, Jan./Feb. 2019, Authorized licensed use limited to: IBM. Downloaded on May 22, 2023 at 19:10:38 UTC from IEEE Xplore.

* cited by examiner

PROACTIVE MICROSERVICE MIGRATION PRIOR TO SERVER FAILURE

BACKGROUND

Embodiments of the present invention relates to server failure, and more specifically, to proactive microservice migration prior to server failure.

SUMMARY

Embodiments of the present invention provide a method, a computer program product, and a computer system, for proactive microservice migration prior to server failure.

One or more processors of a computer system receive a directed acyclic graph (DAG) representing a microservice-based application. The DAG includes nodes and directed edges. Each node represents a microservice. Each microservice is either latency sensitive or not latency insensitive. Each directed edge connects two nodes of the DAG and identifies an order of execution of the microservices represented by the two nodes.

The one or more processors identify a plurality of execution paths passing through nodes of the DAG.

The one or more processors identify, for each microservice represented in the DAG, multiple servers configured to provide each microservice and a plurality of unique servers of the multiple servers.

The one or more processors generate a Continuous Time Markov Chain (CTMC) model for each unique server. The CTMC model is characterized by parameters comprising a failure rate and a repair rate of each unique server.

The one or more processors compute a weight for each unique server equal to $(aN)^n * (bM)^m$, wherein N is a total number of latency sensitive microservices provided by said each unique server, wherein M is a total number of execution paths that include a highest-level microservice provided by said each unique server, and wherein n, m, a, and b are positive real numbers in ranges of $0 < a \leq 1$, $0 < b \leq 1$, $n \geq 1$ and $m \geq 1$.

The one or more processors compute a failure probability of each execution path in dependence on the failure rate, repair rate, and the weight of the unique servers that provide the microservices on each execution path.

The one or more processors select one or more vulnerable paths from the plurality of execution paths, wherein the failure probability of each selected vulnerable path exceeds a specified failure probability threshold.

The one or more processors migrate all microservices on at least one vulnerable path of the one or more vulnerable paths to one or more other servers that differ from the servers on which said all microservices are deployed.

DETAILED DESCRIPTION

Figure 1:
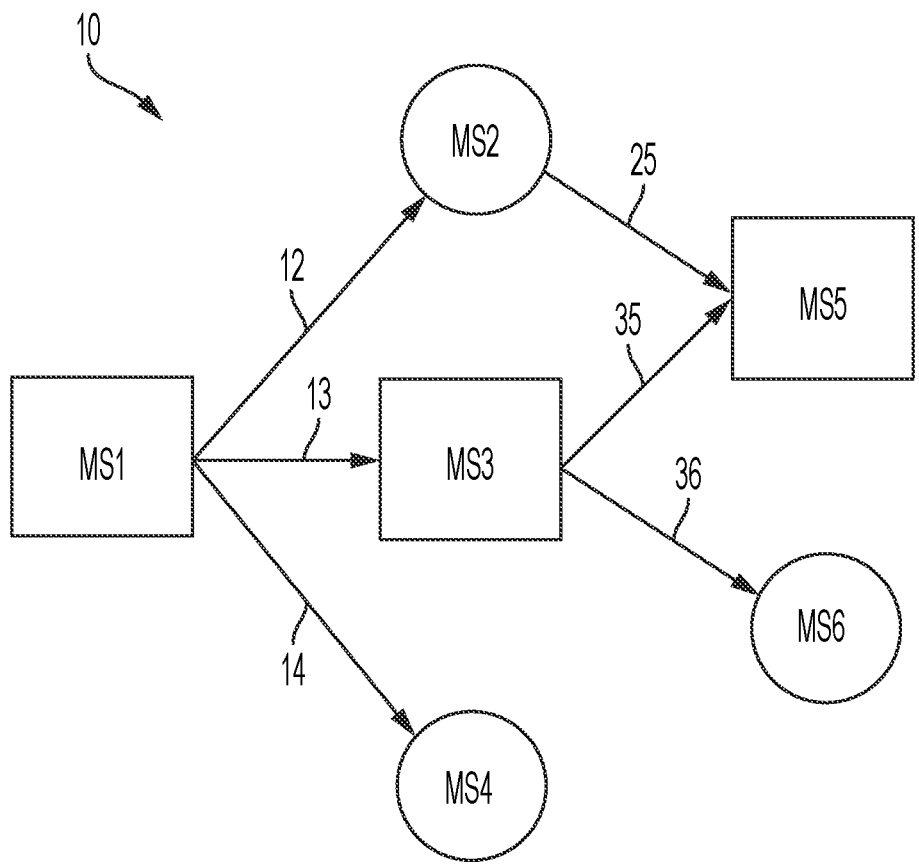
FIG. 1 depicts an embodiment of a directed acyclic graph (DAG) representing a microservice-based application and including microservices as nodes and directed edges between the nodes, in accordance with embodiments of the present invention.

FIG. 1 depicts an embodiment of a directed acyclic graph (DAG) 10 representing a microservice-based application and including microservices MS1, MS2, MS3, MS4 MS5, and MS6 as nodes and directed edges between the nodes, in accordance with embodiments of the present invention.

Each node representing a microservice is referred to as a "microservice node". Thus, microservice nodes MS1, MS2, MS3, MS4 MS5, and MS6 represent microservices MS1, MS2, MS3, MS4 MS5, and MS6, respectively.

Generally in FIG. 1, directed node nm is directed from node MSn to node MSm. Thus, directed node 12 is directed from node MS1 to node MS2. Directed node 13 is directed from node MS1 to node MS3. Directed node 14 is directed from node MS1 to node MS4. Directed node 25 is directed from node MS2 to node MS5. Directed node 35 is directed from node MS3 to node MS5. Directed node 36 is directed from node MS3 to node MS6.

Each microservice is either latency sensitive or not latency insensitive. In FIG. 1, the node of each microservice that is latency sensitive is depicted as a square, and the node of each microservice that is not latency sensitive is depicted as a circle. Thus, microservices MS1, MS3, and MS5 are latency sensitive, and microservices MS2, MS4, and MS6 are not latency sensitive.

Definitionally, the latency of a microservice is the time from when performance of microservice is initiated to the time at which performance of microservice is completed.

Definitionally, a microservice is latency sensitive if performance of the microservice is required to be completed within a time interval less than or equal to a specified maximum time interval threshold.

Each directed edge connects two nodes of DAG 10 and identifies an order of execution of the microservices represented by the two nodes. For example, directed edge 11 connects nodes MS1 and MS2. The arrowhead of directed edge 11 identifies an order of execution of microservices MS1 and MS2 such that microservice MS2 is executed (i.e., performed) after microservice MS1 has been executed.

TABLE 1

| Execution Paths | |
|---|---|
| Execution Path Number | Path of DAG |
| 1 | MS1, MS2, MS5 |
| 2 | MS1, MS3, MS5 |
| 3 | MS1, MS3, MS6 |
| 4 | MS1, MS4 |

The directed edges define illustrative execution paths in DAG 10 which are identified as paths 1-4 in Table 1. Each execution path begins with a node characterized by no directed edge pointing to the node. Each execution path ends with a node characterized by no directed edge pointing away from the node. Thus, all execution paths in Table 1 begin with node MS1 and end with node MS5, MS6, or MS4.

The directed edges define illustrative execution paths in DAG 10 which are identified as paths 1-4 in Table 1. Each execution path begins with a node characterized by no directed edge pointing to the node. Each execution path ends with a node characterized by no directed edge pointing away from the node. Thus, all execution paths in Table 1 begin with node MS1 and end with node MS5, MS6, or MS4.

The DAG 10 of FIG. 1 is a hierarchy of 3 levels (0, 1, 2) of the nodes MS1, MS2, MS3, MS4 MS5, and MS6. Node MS1 is at level 0, nodes MS2, MS3 and MS4 are at level 1, and nodes MS5 and MS6 are at level 2. Level 0 is a higher level than level 1, and level 1 is a higher level than level 2. The execution paths in FIG. 1 delineate a microservice execution sequence that executes microservices sequentially in an order of decreasing hierarchical levels. For example, execution path 1 delineates sequential execution of: node MS1 level 0, node MS2 at level 1, and node MS5 at level 2.

The microservices are performed by servers.

In one embodiment, a server is a traditional rack server.

In one embodiment, a server is a micro-server which is a small form-factor system-on-a-chip (SoC) server that is less expensive, and has less processing power, than traditional rack server. Micro-servers can be grouped into clusters and are well-suited for tasks that do not require multiple central processing units (CPUs).

TABLE 2

Microservices provided by each server

| Server | Microservices | Infrastructure Location |
|---|---|---|
| S1 | MS4 | Edge E1 |
| S2 | MS1, MS3, MS5 | Edge E1 |
| S3 | | Edge E2 |
| S4 | MS2, MS5 | Edge E2 |
| S5 | | Edge E2 |
| S6 | | Cloud |

Table 2 describes an illustrative set of servers (S1, S2, S3, S4, S5, S6) configured to provide the microservices in DAG 10 of FIG. 1 in accordance with the execution paths shown in Table 1.

Table 2 lists the microservices provided by each server. Thus, server S1 provides microservice S4, server S2 provides microservice MS1, MS3, and MS5, and server S4 provides servers MS2 and MS5.

Servers S3, S5 and S6 do not provide any microservice currently but may be candidates for subsequently providing microservices that are migrated from their current servers.

Table 2 illustrates that each server may deploy multiple microservices, and a microservice (e.g., MS5) may be deployed by multiple servers.

Generally, the number of microservices is equal to or greater than the number of servers that currently deploy (i.e., provide) the microservices.

Although the servers S1, . . . S6 may be located within any computer infrastructure, the Infrastructure Location column in Table 2 is in accordance with an edge computing infrastructure comprising edges E1 and E2 and indicates that servers S1 and S2 are in Edge E1, servers S3, S4 and S5 are in edge E2, and server S6 is not in the edge computing infrastructure but rather is in cloud computing infrastructure.

In an embodiment of an edge computing infrastructure, each edge (E1, E2) is a periphery of a network, sufficiently close to the source of data generation that enables servers within each edge to reduce latency of edge microservices in real-time processing and analysis of the data, which reduces a need to transmit vast amounts of data to a centralized cloud or data center for real-time processing and analysis.

Each server (S1, S2, S3, S4, S5, S6) is characterized by parameters including, inter alia, failure rate (e.g., number of failures per day), repair rate, and power model.

The server failure rate of a server is a frequency at which the server experiences malfunctions or ceases to function properly within a given time period, which characterizes the reliability and availability of the server. The failure rate can be measured by the number of failures per unit of time of the server.

The server repair rate of a server is a frequency at which the server is repaired or restored to a functioning state after experiencing a failure, which is a metric that measures the efficiency and effectiveness of the repair process in restoring the failed server to normal operations.

The power model refers to a mathematical or analytical representation that describes the power consumption behavior of the server and is used to estimate or predict the power consumption of the server under different operating conditions, such as varying workloads, utilization levels, or configurations.

The preceding configuration of microservices provided by servers S1, S2, and S4 can change over time due to migration of microservices from servers to other servers in accordance with embodiments of the present invention.

The prior art provides various responses to failure of a server, including: (i) migrating microservices provided by the failed server to one or more other functioning servers; and (ii) failure avoidance via having duplicate microservices (e.g., in Table 2, microservice MS5 is deployed in both server S2 and server S4, so that if server S2 fails then the microservice MS5 can be executed on server S4).

To minimize down time of execution of the microservices, embodiments of the present invention migrate micro services from vulnerable servers that are likely to fail to other servers prior to server failure, as described infra.

Figure 2:
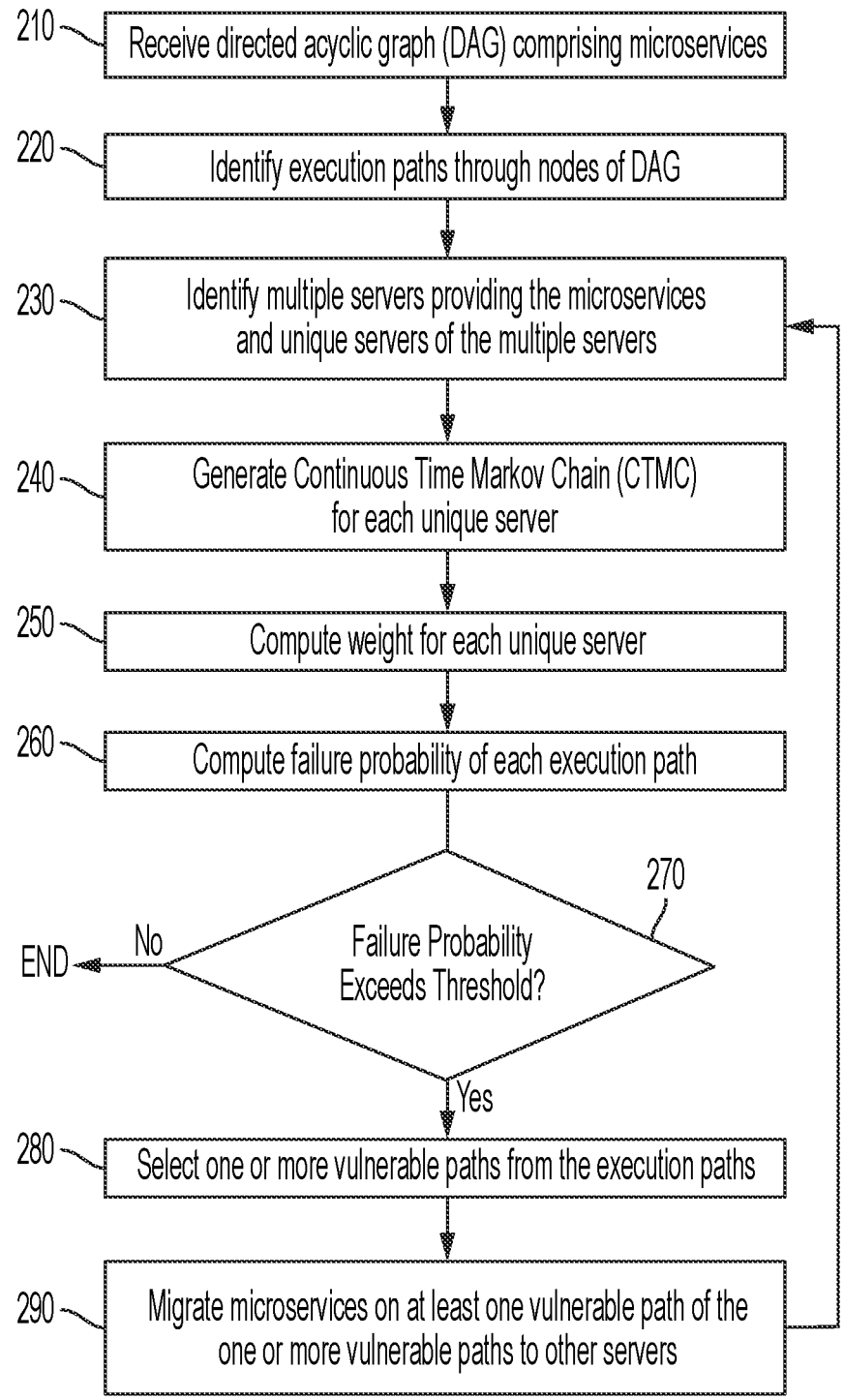
FIG. 2 is a flow chart describing embodiments for migrating one or more microservices from servers likely to fail, in accordance with embodiments of the present invention.

FIG. 2 is a flow chart describing embodiments for migrating one or more microservices from servers likely to fail, in accordance with embodiments of the present invention.

The flow chart of FIG. 2 is applicable to any DAG that fits within the scope of embodiments of the present invention and is applied specifically to DAG 10 in conjunction with FIG. 1 and Tables 1-2 as discussed supra.

The flow chart of FIG. 2 includes steps 210-290.

Step 210 receives a directed acyclic graph (DAG) representing a microservice-based application, such as DAG 10 of FIG. 1. In one embodiment, DAG 10 may be received from a volatile or non-volatile storage device on which DAG 10 is stored. In one embodiment, DAG 10 may be received from user input that specifies the structure of DAG 10 or specifies a pointer to data storage on which DAG 10 is stored.

DAG 10 includes nodes and directed edges. Each node represents a microservice. Each microservice is either being either latency sensitive or not latency insensitive. Each directed edge connects two nodes of DAG 10 and identifies an order of execution of the microservices represented by the two nodes.

DAG 10 includes nodes MS1, MS2, MS3, BS4, MS5 and MS6 of which nodes MS1, MS3 and MS5 are latency sensitive and nodes MS2, MS4 and MS6 are not latency sensitive.

DAG 10 includes directed edges 12, 13, 14, 25, 35 and 36 which respectively identify the following execution orderings: execution of node MS2 is performed after execution of node MS1, execution of node MS3 after execution of node MS1, execution of node MS4 is performed after execution of node MS1, execution of node MS5 is performed after execution of node MS2, execution of node MS5 is performed after execution of node MS3, and execution of node MS6 is performed after execution of node MS3.

Step 220 identifies a plurality of execution paths passing through nodes of the DAG.

The execution paths for DAG 10 are depicted in Table 1.

Step 230 identifies multiple servers configured to provide each microservice and to provide a plurality of unique servers of the multiple servers.

TABLE 3

Servers providing each microservice

| Microservice | Is microservice latency sensitive? | Server(s) providing microservice |
|---|---|---|
| MS1 | Yes | S2 |
| MS2 | No | S4 |
| MS3 | Yes | S2 |
| MS4 | No | S1 |
| MS5 | Yes | S2, S4 |

The identified multiple servers configured to provide each microservice are depicted in Table 3 which is derived from Table 2. Specifically, the identified multiple servers respectively providing microservices MS1, MS2, MS3, MS4 and MS5 in Table 2 are S2, S4, S2, S1, S2 and S4, of which servers S1, S2 and S4 are unique. Thus, for DAG 10, step 230 identifies the plurality of unique servers consisting of S1, S2 and S4.

Figure 3:
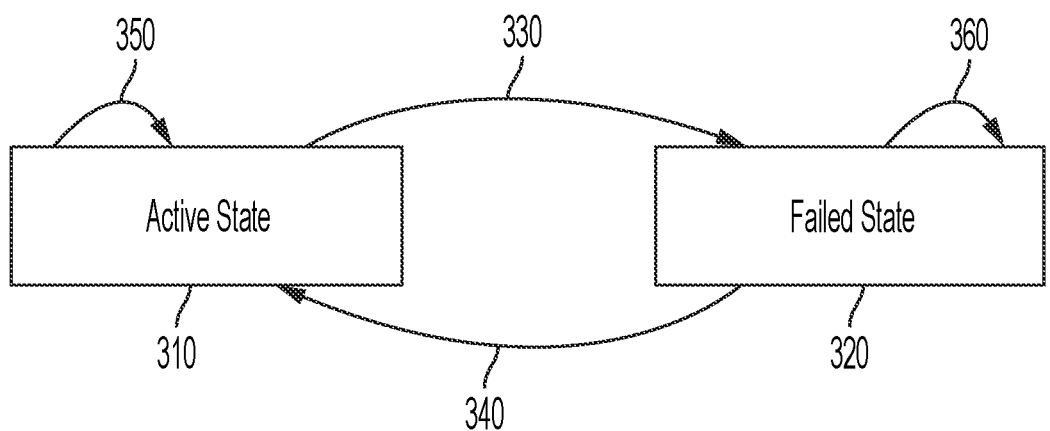
FIG. 3 depicts an embodiment of a Continuous Time Markov Chain (CTMC) model for each unique server of multiple unique servers, in accordance with embodiments of the present invention.

Step 240 generates a Continuous Time Markov Chain (CTMC) model for each unique server as described infra in FIG. 3.

FIG. 3 depicts an embodiment of a Continuous Time Markov Chain (CTMC) model for each unique server, in accordance with embodiments of the present invention.

The CTMC model for each unique server is characterized by parameters comprising a failure rate and a repair rate of each unique server.

The CTMC model in FIG. 3 depicts an active state 310 of a server, a failed state 320 of the server, and state transitions 330, 340, 350 and 360 for the server. An active state is a state in which the server is functioning normally without error. A failed state is a state in which the server functions incorrectly or fails to function.

State transition 330 is a transition from the active state 310 to the failed state 320 and is characterized by the failure rate of the server (i.e., rate at which the server transitions from the active state 310 to the failed state 320).

State transition 340 is a transition from the failed state 320 to the active state 310 and is characterized by the repair rate of the server (i.e., rate at which the server transitions from the failed state 320 to the active state 310).

State transition 350 is a self-transition within the active state 310 (i.e., the server remains in the active state 310) and is characterized by a parameter such as, inter alia, mean time in the active state 310.

State transition 360 is a self-transition within the failed state 320 (i.e., the server remains in the failed state 320) and is characterized by a parameter such as, inter alia, mean time in the failed state 320.

Returning to FIG. 2, step 250 computes a weight for each unique server equal to $(aN)^n*(bM)^m$, wherein N is a total number of latency sensitive microservices provided by each unique server, wherein M is a total number of execution paths that include a highest-level microservice provided by each unique server, and wherein n, m, a, and b are positive real numbers in ranges of $0<a\leq1$, $0<b\leq1$, $n\geq1$ and $m\geq1$.

The computed weights impact calculations of failure probability of each execution path as will be discussed infra in conjunction with step 260.

Figure 4:
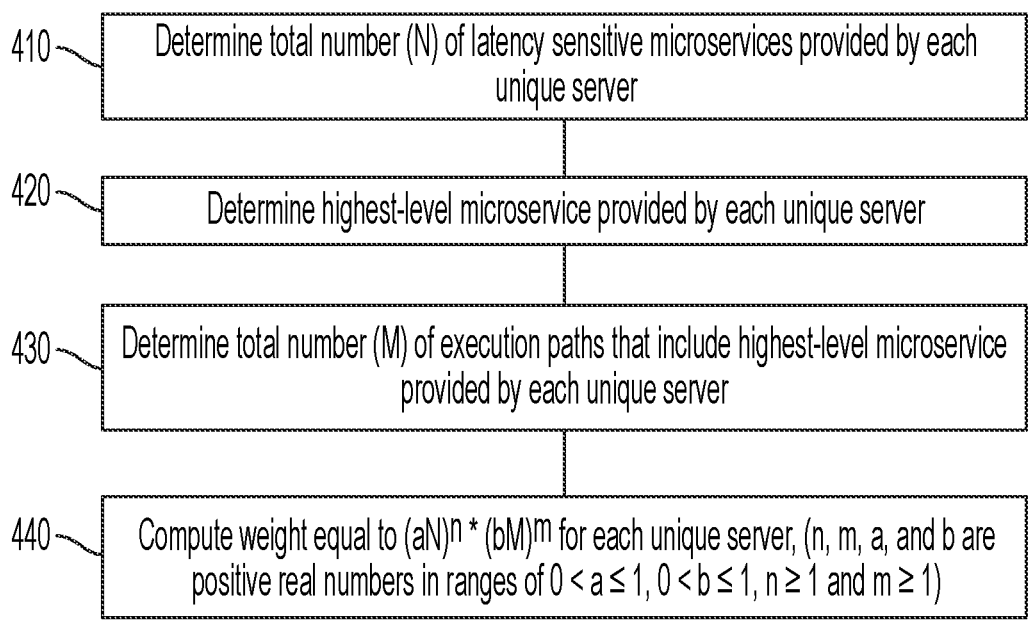
FIG. 4 is a flow chart describing embodiments for computing a weight to be assigned to each unique server, in accordance with embodiments of the present invention.

Step 260 computes the weight for each unique server in accordance with FIG. 4 as described infra.

FIG. 4 is a flow chart describing embodiments for computing a weight to be assigned to each unique server, in accordance with embodiments of the present invention. The flow chart of FIG. 4 includes steps 410-440 for each unique server.

Step 410 determines a total number (N) of latency sensitive microservices provided by each unique server.

Step 420 determines a highest-level microservice provided by each unique server.

Step 430 determines a total number (M) of execution paths that include the highest-level microservice provided by each unique server.

Step 440 computes a weight equal to $(aN)^n*(bM)^m$ for each unique server, wherein n, m, a, and b are positive real numbers in ranges of $0<a\leq1$, $0<b\leq1$, $n\geq1$ and $m\geq1$.

In one embodiment, $a=b=n=m=1$, so that the weight is $N*M$.

In one embodiment, a is unequal to b and $n=m=1$, so that the weight is $(aN)*(bM)$ in which N and M are weighted relative to each other by a and b, respectively.

In one embodiment, $a=b=1$ and at least one of n and m is unequal to 1, so that exemplary weights may be: $N^2*M$, $N*M^2$, $N^2*M^2$, $N^{1/2}*M^{1/2}$, $N^{1/2}*M$, $N*M^{1/2}$, $N*M^3$, $N^3*M$, $N^2*M^3$, $N^3*M^2$, etc. In this embodiment, n and m are selected based on power consumption of servers with respect to the power model described supra, wherein servers with high power consumption are assigned n and m values higher than 1 (e.g., n and m values of, inter alia, 2 and 3 as indicated in the preceding exemplary weights).

In one embodiment, a is unequal to b and at least one of n and m is unequal to 1.

In one embodiment, a and b are selected from the group consisting of $a=1$ and b is unequal to 1, a is unequal to 1 and $b=1$, and a and b are each unequal to 1.

An illustrative calculation of the weights for unique servers S1, S2 and S4 are next presented in conjunction with DAG 10 of FIG. 1 under the assumption that $a=b=n=m=1$, so that the weight is computed as $N*M$ for each unique server (S1, S2, S4).

Server S1 provides microservice MS4 which is not latency sensitive, so that $N=0$ and the weight of server S1 is zero.

Server S2 provides 3 latency sensitive microservices (MS1, MS3, MS5), so that $N=3$. Microservice MS1 is at level 0 in the DAG 10 and is thus the highest-level microservice provided by server S2, since microservice MS3 is at level 1 and microservice MS5 is at level 2 in the DAG 10. Since microservice MS1 is in each of the 4 execution paths 1-4, $M=4$. Accordingly, the weight of server S2 is 12 (i.e., $3*4$).

Server S4 provides microservice MS2 and MS5 of which only microservice MS5 is latency sensitive, so that N=1. Microservice MS2 is at level 1 in the DAG 10 and is thus the highest-level microservice provided by server S4, since microservice MS5 is at level 2 in the DAG 10. Since microservice MS2 is in only in one execution path (namely, execution path 1), M=1. Accordingly, the weight of server S4 is 1 (i.e., 1*1).

Returning to FIG. 2, step 260 computes a failure probability of each execution path in dependence on the failure rate, the repair rate, and the weight of the unique servers that provide the microservices on each execution path.

More specifically, the failure probability of an execution path is calculated as the product of the failure probabilities of the unique servers that execute the microservices on the execution path.

For example, execution path 4 in the DAG 10 consists of microservices MS1 (provided by server S2) and MS4 (provided by server S1), so that the failure probability of execution path 4 in the DAG 10 is equal to the product of FP12 and FP41, wherein FP12 is the failure probability of server S2 that provides microservice MS1, and wherein F41 is the failure probability of server S1 that provides microservice MS4.

Thus FPik, which is the failure probability of server Sk that provides microservice MSi, needs to be computed for all combinations of microservice MSi provided by server Sk that occur in the execution paths of the DAG.

Calculation of FPik is known prior art that uses input of: the failure rate of server Sk, the repair rate of server Sk, and the weight of server Sk, in accordance with the CTMC model of server Sk, wherein the weight of server Sk serves as a multiplier on both the failure rate and repair rate of server Sk.

The failure probability of Sik that is known prior art is calculated in accordance with exponentially distributed random variables represented by the failure rate and repair rate of server Sk modified by the weight of server Sk as mentioned supra. The exponentially distributed random variables describe the time between events that occur at a constant rate and independently of each other and are widely utilized to model the failure and repair rates, which allows utilizing mean time between failure (MTBF) values, wherein if the MTBF is r, then the associated rate for the (failure) event is 1/r and the probability that a failure occurs by time t is calculated as (1−exp(−rt)), where "exp" denotes exponentiation.

Additional details from which the calculation of Sik may be ascertained are disclosed in references of: (i) Calder, Muffy, and Michele Sevegnani. "Stochastic model checking for predicting component failures and service availability." *IEEE Transactions on Dependable and Secure Computing* 16, no. 1 (2017): 174-187, and (ii) Kwiatkowska, Marta, Gethin Norman, and David Parker. "Stochastic model checking." *Formal Methods for Performance Evaluation: 7th International School on Formal Methods for the Design of Computer, Communication, and Software Systems*, SFM 2007, Bertinoro, Italy, May 28-Jun. 2, 2007, Advanced Lectures 7 (2007): 220-270.

Step 270 determines whether the computed failure probability of any of the execution paths exceeds a specified failure probability threshold, and if so step 280 is next executed, and if not the method ends.

Step 280 selects all execution paths whose failure probability exceeds the specified failure probability threshold. Each such selected path is considered to be a vulnerable path. Accordingly, step 280 selects one or more vulnerable paths from the plurality of execution paths.

Step 290 migrates all microservices on at least one vulnerable path of the one or more vulnerable paths to one or more other servers that differ from the servers on which said all microservices are deployed (i.e., provided), followed by branching back to step 230 and iteratively repeating steps 230-290 until step 270 determines that the computed failure probability of all of the execution paths does not exceed the specified failure probability threshold.

In one embodiment, the one or more other servers to which all microservices on the at least one vulnerable path are migrated may be chosen according specified criteria such as, inter alia: or (i) each other server has a failure rate that is below the failure rate of all servers deploying microservices migrated in step 290; (ii) each other server has a failure rate below a specified failure rate threshold, or (iii) each other server has a failure rate that is below the other server's repair rate or is above the other server's repair rate by less than a specified rate differential threshold.

The iterative looping through steps 230-290 ensures identification of all vulnerable paths (i.e., all execution paths having a failure probability that exceeds the failure probability threshold) and avoids migrating microservices whose failure probability does not exceed the failure probability threshold.

In one embodiment, the failure probability threshold is constant.

In one embodiment, the failure probability threshold is specified to have an iteration dependent value. For example, the failure probability threshold could be arbitrarily small (e.g., 0.00001) for the first pass though steps 210-290 and then is changed to a value arbitrarily close to 1 (e.g., 0.99999) for the iterations following the first pass though steps 210-290. In this example in the first pass, the "Yes" branch from step 270 is effective (because the failure probability of all execution paths exceed 0.00001) and the microservice migration in step 280 occurs with all execution paths being vulnerable paths. In this example in the iteration following the first pass, the "No" branch from step 270 is effective (because the failure probability of all execution paths are below 0.99999) and the method ends.

The preceding example is equivalent to another embodiment of the present invention, depicted in FIG. 5, in which the flow chart of FIG. 2 is modified as follows: step 270 is deleted and the branching back to step 230 following execution of step 290 is deleted.

Figure 5:
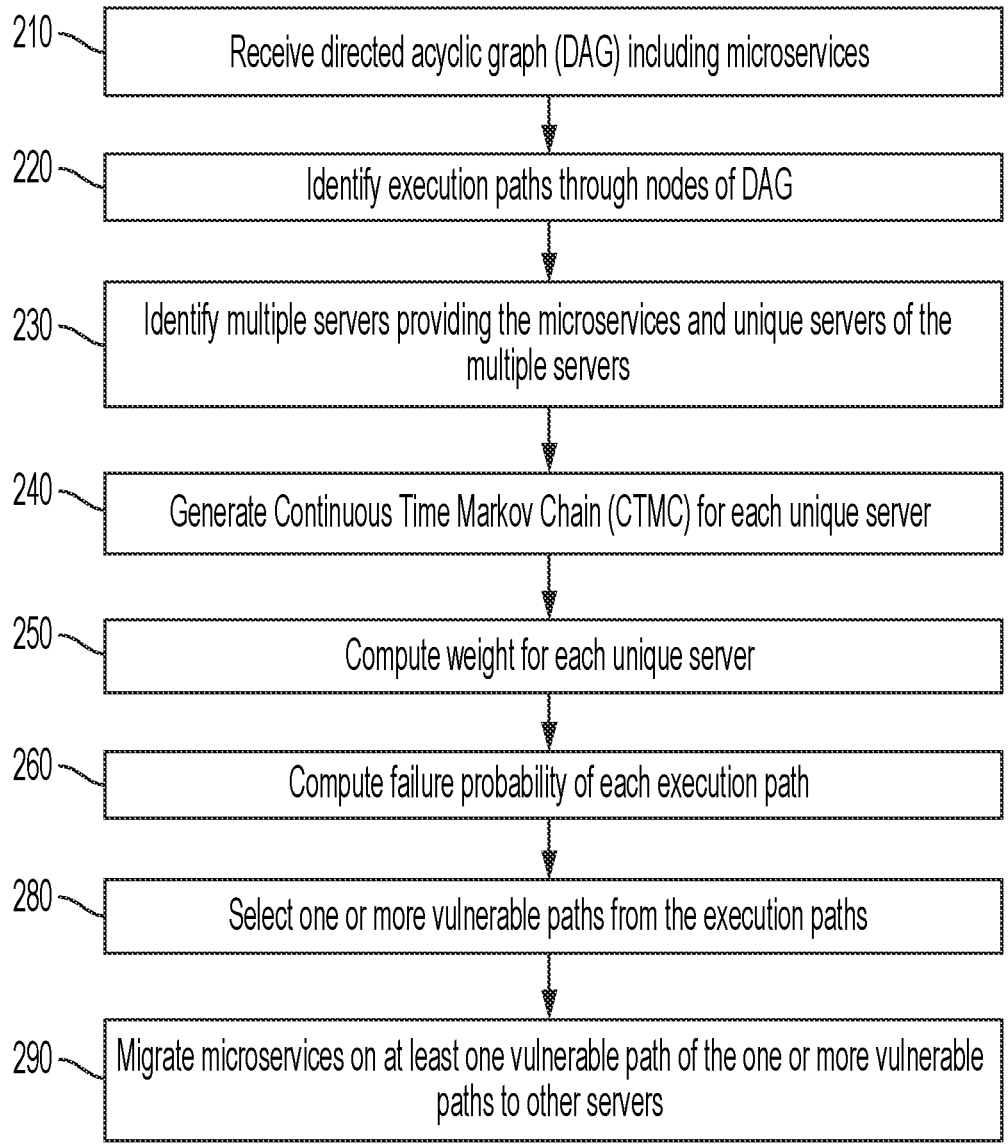
FIG. 5, which is a modification of FIG. 2, is a flow chart describing embodiments for migrating one or more microservices from servers likely to fail, in accordance with embodiments of the present invention.

Thus, FIG. 5, which is a modification of FIG. 2, is a flow chart describing embodiments for migrating one or more microservices from servers likely to fail, in accordance with embodiments of the present invention. The steps 210, 220, 230, 240, 250, 260, 280 and 290 in FIG. 5 are performed as described supra for the same steps in FIG. 2.

TABLE 4

Failure Probability of Execution Paths

| Execution Path Number | Path of DAG | Failure Probability | Rank |
|---|---|---|---|
| 2 | MS1, MS3, MS5 | .912 | 1 |
| 1 | MS1, MS2, MS5 | .908 | 2 |
| 3 | MS1, MS3, MS6 | .621 | 3 |
| 4 | MS1, MS4 | .589 | 4 |

Table 4 illustrates illustrative failure probabilities resulting from execution of step 260.

The listed failure probabilities in Table 4 are ordered according to rank in descending order of failure probability.

The listed failure probabilities were not actually calculated but rather have values selected to illustrate embodiments for selecting the least one vulnerable path whose included microservices are migrated in step 290 of FIG. 2.

The specified failure probability threshold is 0.80, so that execution paths 2 and 1, which are ranked 1 and 2, have failure probabilities of 0.912 and 0.908, respectively, which exceed the failure probability threshold 0.80. In contrast, execution paths 3 and 4 have failure probabilities of 0.629 and 0.589, respectively, which are below the failure probability threshold 0.80. Thus, the vulnerable paths in Table 4 are execution paths 2 and 1.

In one embodiment, the at least one vulnerable path whose included microservices are migrated consists of one most vulnerable path whose failure probability exceeds the failure probability of each other execution path of the plurality of execution paths. In Table 4, the one most vulnerable path is the highest ranked execution path 2.

In one embodiment, the one or more vulnerable paths is a plurality of vulnerable paths, and the at least one vulnerable path consists of the plurality of vulnerable paths. In Table 4, the plurality of vulnerable paths consists of execution paths 2 and 1, so that the at least one vulnerable path also consists of execution paths 2 and 1.

In one embodiment, the one or more vulnerable paths is a plurality of vulnerable paths, wherein the at least one vulnerable path comprises a most vulnerable path whose failure probability exceeds the failure probability of each other vulnerable path of the plurality of vulnerable paths, and wherein at least one vulnerable path further comprises at least one other vulnerable path of the plurality of vulnerable paths whose failure probability differs from the failure probability of the most vulnerable path by less than a specified failure probability difference threshold. In Table 4 with the specified failure probability difference threshold assumed to be 0.05, the at least one vulnerable path consists of execution paths 1 and 2 because the difference of failure probability of execution paths 1 and 2 is 0.04 (i.e., 0.912-0.908) which is less than the failure probability difference threshold of 0.05.

Figure 6:
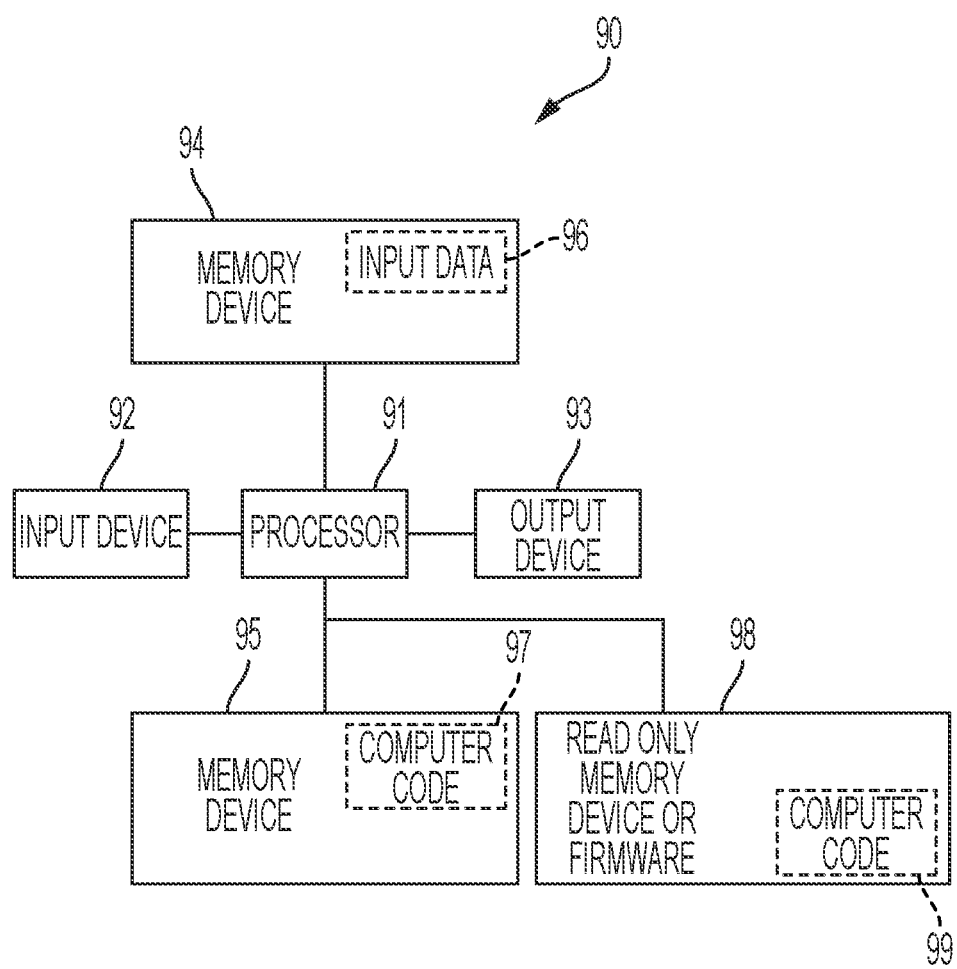
FIG. 6 illustrates an embodiment of a computer system, in accordance with embodiments of the present invention.

FIG. 6 illustrates an embodiment of a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Figure 7:
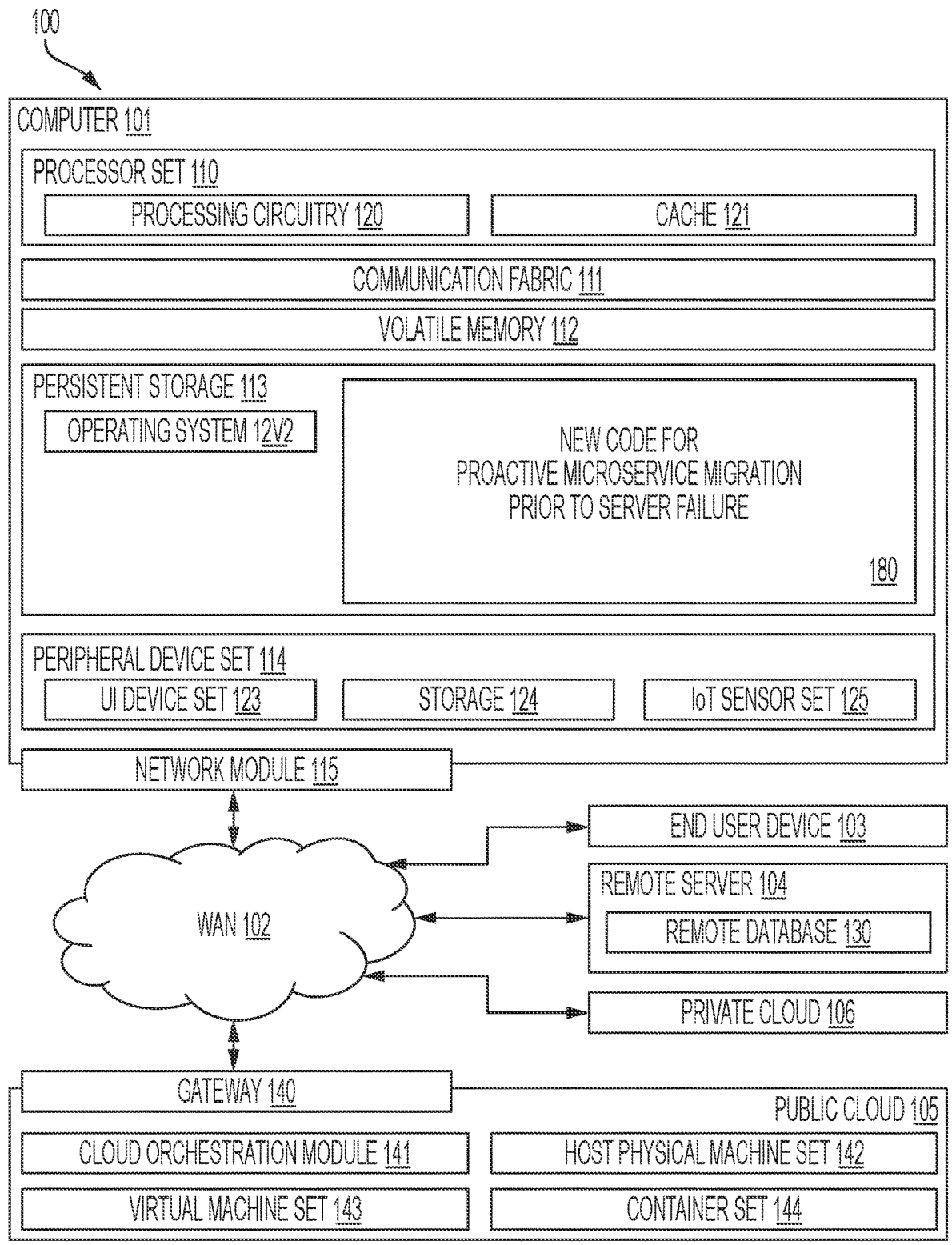
FIG. 7 depicts a computing environment which contains an example of an environment for the execution of at least some of the computer code involved in performing the inventive methods, in accordance with embodiments of the present invention.

FIG. 7 depicts a computing environment 100 which contains an example of an environment for the execution of at least some of the computer code involved in performing the inventive methods, in accordance with embodiments of the present invention. Such computer code includes new code for proactive microservice migration prior to server failure 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 7. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for proactive microservice migration prior to server failure, said method comprising the steps of:
   (a) receiving, by one or more processors of a computer system, a directed acyclic graph (DAG) representing a microservice-based application, said DAG comprising nodes and directed edges, each node denoting a microservice, each microservice being either latency sensitive or not latency insensitive, each directed edge connecting two nodes of the DAG and identifying an order of execution of the microservices represented by the two nodes;
   (b) identifying, by the one or more processors, a plurality of execution paths passing through nodes of the DAG;
   (c) for each microservice represented in the DAG, identifying, by the one or more processors, multiple servers configured to provide each microservice and a plurality of unique servers of the multiple servers;
   (d) generating, by the one or more processors, a Continuous Time Markov Chain (CTMC) model for each unique server, said CTMC model characterized by parameters comprising a failure rate and a repair rate of said each unique server;
   (e) computing, by the one or more processors, a weight for each unique server equal to $(aN)^n*(bM)^m$, wherein N is a total number of latency sensitive microservices provided by said each unique server, wherein M is a total number of execution paths that include a highest-level microservice provided by said each unique server, and wherein n, m, a, and b are positive real numbers in ranges of $0<a\leq 1$, $0<b\leq 1$, $n\geq 1$ and $m\geq 1$;
   (f) computing, by the one or more processors, a failure probability of each execution path in dependence on the failure rate, repair rate, and the weight of the unique servers that provide the microservices on each execution path;
   (g) selecting, by the one or more processors, one or more vulnerable paths from the plurality of execution paths, wherein the failure probability of each selected vulnerable path exceeds a specified failure probability threshold; and
   (h) migrating, by the one or more processors, all microservices on at least one vulnerable path of the one or more vulnerable paths to one or more other servers that differ from the servers on which said all microservices are deployed.

2. The method of claim 1, said method further comprising the steps of:
   (i) after said migrating, repeating steps (c)-(f) to determine a new failure probability of each execution path;
   (j) ascertaining whether the new failure probability of all execution paths exceeds the specified failure probability threshold and if so, iteratively repeating steps (g), (h), (i), and (j) until said ascertaining ascertains that the new failure probability of each execution path does not exceed the specified failure probability threshold.

3. The method of claim 1, wherein the at least one vulnerable path consists of one most vulnerable path whose failure probability exceeds the failure probability of each other execution path of the plurality of execution paths.

4. The method of claim 1, wherein the one or more vulnerable paths is a plurality of vulnerable paths, and wherein the at least one vulnerable path consists of the plurality of vulnerable paths.

5. The method of claim 1, wherein the one or more vulnerable paths is a plurality of vulnerable paths, wherein the at least one vulnerable path comprises a most vulnerable path whose failure probability exceeds the failure probability of each other vulnerable path of the plurality of vulnerable paths, and wherein at least one vulnerable path further comprises at least one other vulnerable path of the plurality of vulnerable paths whose failure probability differs from the failure probability of the most vulnerable path by less than a specified failure probability difference threshold.

6. The method of claim 1, wherein n=m=a=b=1.

7. The method of claim 1, wherein a=b=1 and at least one of n and m is unequal to 1.

8. The method of claim 1, wherein a and b are selected from the group consisting of a=1 and b unequal to 1, a unequal to 1 and b=1, and a and b are each unequal to 1.

9. A computer program product, comprising one or more computer readable hardware storage devices having computer readable program code stored therein, said program code containing instructions executable by one or more processors of a computer system to implement a method for proactive microservice migration prior to server failure, said method comprising the steps of:
  (a) receiving, by the one or more processors, a directed acyclic graph (DAG) representing a microservice-based application, said DAG comprising nodes and directed edges, each node denoting a microservice, each microservice being either latency sensitive or not latency insensitive, each directed edge connecting two nodes of the DAG and identifying an order of execution of the microservices represented by the two nodes;
  (b) identifying, by the one or more processors, a plurality of execution paths passing through nodes of the DAG;
  (c) for each microservice represented in the DAG, identifying, by the one or more processors, multiple servers configured to provide each microservice and a plurality of unique servers of the multiple servers;
  (d) generating, by the one or more processors, a Continuous Time Markov Chain (CTMC) model for each unique server, said CTMC model characterized by parameters comprising a failure rate and a repair rate of said each unique server;
  (e) computing, by the one or more processors, a weight for each unique server equal to $(aN)^n*(bM)^m$, wherein N is a total number of latency sensitive microservices provided by said each unique server, wherein M is a total number of execution paths that include a highest-level microservice provided by said each unique server, and wherein n, m, a, and b are positive real numbers in ranges of $0<a\leq1$, $0<b\leq1$, $n\geq1$ and $m\geq1$;
  (f) computing, by the one or more processors, a failure probability of each execution path in dependence on the failure rate, repair rate, and the weight of the unique servers that provide the microservices on each execution path;
  (g) selecting, by the one or more processors, one or more vulnerable paths from the plurality of execution paths, wherein the failure probability of each selected vulnerable path exceeds a specified failure probability threshold; and
  (h) migrating, by the one or more processors, all microservices on at least one vulnerable path of the one or more vulnerable paths to one or more other servers that differ from the servers on which said all microservices are deployed.

10. The computer program product of claim 9, said method further comprising the steps of:
  (i) after said migrating, repeating steps (c)-(f) to determine a new failure probability of each execution path;
  (j) ascertaining whether the new failure probability of all execution paths exceeds the specified failure probability threshold and if so, iteratively repeating steps (g), (h), (i), and (j) until said ascertaining ascertains that the new failure probability of each execution path does not exceed the specified failure probability threshold.

11. The computer program product of claim 9, wherein the at least one vulnerable path consists of one most vulnerable path whose failure probability exceeds the failure probability of each other execution path of the plurality of execution paths.

12. The computer program product of claim 9, wherein the one or more vulnerable paths is a plurality of vulnerable paths, and wherein the at least one vulnerable path consists of the plurality of vulnerable paths.

13. The computer program product of claim 9, wherein the one or more vulnerable paths is a plurality of vulnerable paths, wherein the at least one vulnerable path comprises a most vulnerable path whose failure probability exceeds the failure probability of each other vulnerable path of the plurality of vulnerable paths, and wherein at least one vulnerable path further comprises at least one other vulnerable path of the plurality of vulnerable paths whose failure probability differs from the failure probability of the most vulnerable path by less than a specified failure probability difference threshold.

14. The computer program product of claim 9, wherein $n=m=a=b=1$.

15. A computer system, comprising one or more processors, one or more memories, and one or more computer readable hardware storage devices, said one or more hardware storage devices containing program code executable by the one or more processors via the one or more memories to implement a method for proactive microservice migration prior to server failure, said method comprising the steps of:
  (a) receiving, by the one or more processors, a directed acyclic graph (DAG) representing a microservice-based application, said DAG comprising nodes and directed edges, each node denoting a microservice, each microservice being either latency sensitive or not latency insensitive, each directed edge connecting two nodes of the DAG and identifying an order of execution of the microservices represented by the two nodes;
  (b) identifying, by the one or more processors, a plurality of execution paths passing through nodes of the DAG;
  (c) for each microservice represented in the DAG, identifying, by the one or more processors, multiple servers configured to provide each microservice and a plurality of unique servers of the multiple servers;
  (d) generating, by the one or more processors, a Continuous Time Markov Chain (CTMC) model for each unique server, said CTMC model characterized by parameters comprising a failure rate and a repair rate of said each unique server;
  (e) computing, by the one or more processors, a weight for each unique server equal to $(aN)^n*(bM)^m$, wherein N is a total number of latency sensitive microservices provided by said each unique server, wherein M is a total number of execution paths that include a highest-level microservice provided by said each unique server, and wherein n, m, a, and b are positive real numbers in ranges of $0<a\leq1$, $0<b\leq1$, $n\geq1$ and $m\geq1$;
  (f) computing, by the one or more processors, a failure probability of each execution path in dependence on the failure rate, repair rate, and the weight of the unique servers that provide the microservices on each execution path;
  (g) selecting, by the one or more processors, one or more vulnerable paths from the plurality of execution paths, wherein the failure probability of each selected vulnerable path exceeds a specified failure probability threshold; and
  (h) migrating, by the one or more processors, all microservices on at least one vulnerable path of the one or more vulnerable paths to one or more other servers that differ from the servers on which said all microservices are deployed.

16. The computer system of claim 15, said method further comprising the steps of:
  (i) after said migrating, repeating steps (c)-(f) to determine a new failure probability of each execution path;
  (j) ascertaining whether the new failure probability of all execution paths exceeds the specified failure probability threshold and if so, iteratively repeating steps (g), (h), (i), and (j) until said ascertaining ascertains that the new failure probability of each execution path does not exceed the specified failure probability threshold.

17. The computer system of claim 15, wherein the at least one vulnerable path consists of one most vulnerable path whose failure probability exceeds the failure probability of each other execution path of the plurality of execution paths.

18. The computer system of claim 15, wherein the one or more vulnerable paths is a plurality of vulnerable paths, and wherein the at least one vulnerable path consists of the plurality of vulnerable paths.

19. The computer system of claim 15, wherein the one or more vulnerable paths is a plurality of vulnerable paths, wherein the at least one vulnerable path comprises a most vulnerable path whose failure probability exceeds the failure probability of each other vulnerable path of the plurality of vulnerable paths, and wherein at least one vulnerable path further comprises at least one other vulnerable path of the plurality of vulnerable paths whose failure probability differs from the failure probability of the most vulnerable path by less than a specified failure probability difference threshold.

20. The computer system of claim 15, wherein $n=m=a=b=1$.

* * * * *